May 28, 1963

A. R. HARRIS 3,091,674

CONTROL APPARATUS

Filed July 15, 1960

INVENTOR.
ARVEL R. HARRIS
BY
*[signature]*
ATTORNEY

May 28, 1963 A. R. HARRIS 3,091,674
CONTROL APPARATUS

Filed July 15, 1960 2 Sheets-Sheet 2

INVENTOR
ARVEL R. HARRIS
BY
ATTORNEY

United States Patent Office 3,091,674
Patented May 28, 1963

3,091,674
CONTROL APPARATUS
Arvel R. Harris, Pompano Beach, Fla., assignor to Ranco Incorporated, Columbus, Ohio, a corporation of Ohio
Filed July 15, 1960, Ser. No. 43,180
1 Claim. (Cl. 200—61.06)

The present invention relates to control apparatus which operates an electric switch in response to changes in a condition, such as humidity.

The principal object of the present invention is the provision of a control apparatus of the character mentioned comprising an electric switch operated by a lever movable by changes in length of a humidity responsive element, for example, the tension of which element is arranged to be manually adjustable to vary the percentage of relative humidity at which the element responds to actuate the switch, the manually adjustable mechanism being arranged to engage and actuate the switch operating lever in opposite directions to provide manual control of the switch independently of the humidity responsive element.

More specifically, an object of the invention is the provision of a control apparatus of the character mentioned comprising a U-shaped frame with first and second levers at opposite ends of the frame and pivoted between the side walls thereof, which levers support an elongated humidity responsive element, or the like, adjacent to the yoke wall or the wall inter-connecting the side walls of the frame, an electrical switch being supported between the two side walls at the open side of the frame and actuated by the first lever, and a manually operable cam mechanism rotatably supported between the side walls of the frame adjacent to the opposite side of the frame and arranged to cooperate with the second lever to shift the latter about its pivot to vary the tension on the element, the cam including a shaft which has a finger for engaging opposite sides of the first lever toward opposite ends of the angular movement of the cam shaft to positively operate the switch in opposite directions. By this arrangement a relatively compact apparatus is provided, and the cam mechanism can be arranged to cause the cam shaft to project either through the open end of the frame or through an opening in the side wall of the frame, whereby the apparatus is adaptable for different desired styles of manual adjustment arrangements.

Other objects and advantages of the invention will be apparent from the following description of preferred forms of the invention, reference being made to the accompanying drawings wherein.

Figure 1:
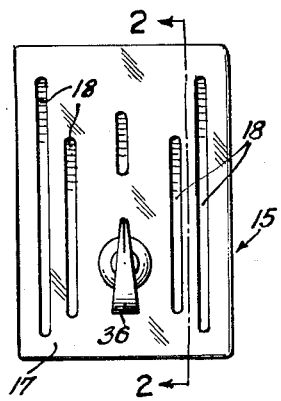
FIG. 1 is a front elevational of a humidistatic control embodying the invention.

Referring to the embodiment of the invention shown in FIGS. 1 through 5, a control apparatus 15 is shown for controlling the operation of an electrically driven dehumidifier, not shown, and which is attached to a wall bracket 16 to which a suitable cover 17 is attached, as by a sliding friction fit. The front panel of cover 17 has slots 18 therein to permit circulation of air to the inside of the cover.

Control apparatus 15 comprises a U-shaped sheet metal frame 20 having opposed side walls 20a and 20b interconnected by a yoke wall 20c, the latter having large air openings 20d formed therethrough. Side wall 20b has threaded openings to receive bolts by which frame 20 is attached to mounting plate 16. For sake of clarity these threaded openings are not shown.

Figure 3:
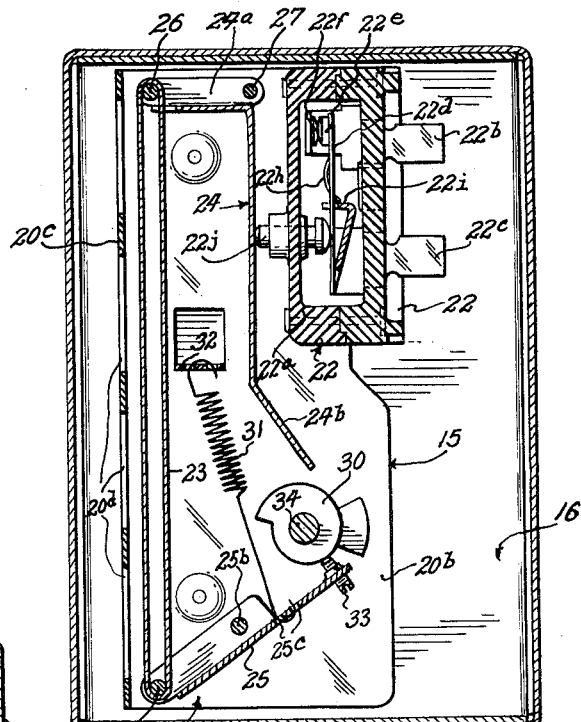
FIG. 3 is a sectional view taken along line 3—3 of FIG. 2.

An electrical snap switch 22 is mounted in a hollow block 22a of suitable insulating material and includes terminals 22b and 22c, which are embedded in the right hand wall of the insulating block, as viewed in FIG. 3, and which extend inside the block and support a snap-switch mechanism comprising a spring blade 22d, the lower end of which is attached to a bracket formed on terminal 22c and the opposite end of which carries a contact 22e arranged to engage a fixed contact 22f supported on a bridge formed on terminal 22b. Switch blade 22d includes a tongue 22h which is bowed and maintained in compression by engaging a rigid pivot member 22i and is operative to resiliently urge blade 22d either to the right or left to open and close contacts 22d and 22e respectively. Blade 22d is normally biased toward the left or the contact closing position, as shown in FIG. 3, and a plunger 22j, arranged to slide in a bushing through the left hand wall of housing 22a, engages the blade, and when moved to the right, flexes the lower end of the blade to the right to cause the lower portion of the blade to move to the right side of the pivot point for tongue 22h which causes the tongue to snap the upper end of the switch blade from contact 22f. When the plunger is released, the normal bias of the blade causes it to return to the contact closing position with a snap action imparted thereto by the bowed tongue 22b. Any other suitable switch mechanism could be employed and that described is merely by way of illustration only.

Switch 22 is arranged to be actuated according to the expansion and contraction of a moisture sensitive element 23, which may be formed of any suitable material of such character that it changes in length according to the degree of moisture content of the air surrounding the element, and one suitable form of element is a nylon band. Band 23 is supported in extended form adjacent to wall 20c by levers 24 and 25. Lever 24 comprises an L-shape sheet metal member having two upturned flanges 24a on opposite sides of one leg thereof, only one of which flanges appears in the drawings, and which flanges have opposed openings at one end to receive a pivot pin 27, the ends of which are supported in openings through the side walls of the frame. The left hand end of flanges 24a supports a pin 26 about which one end of band 23 is looped so that construction of the band swings lever 24 counterclockwise about its pivot. The downwardly projecting arm of lever 24b is arranged to engage plunger 22j and actuate the switch mechanism to the open position as lever 24 is rotated counterclockwise.

Lever 25 comprises a sheet metal plate having two opposed upturned flanges 25a, which receive a pivot pin 25b, the ends of which are journaled in the sides of the frame. Flanges 25a also support a pin 29 about which the lower end of band 23 is looped and retained so that the angular position of lever 25 controls the tension applied to the moisture sensitive band. The angular position of lever 25 is controlled by a cam 30 against which the right hand end of the lever is drawn by a tension spring 31, one end of which is anchored to a tab 32 struck from a side of frame 15 and the other end of which is hooked in openings 25c in the lever. Preferably, a screw 33 is threaded in an opening through lever 25 and engages the periphery of cam 30 to provide a fine adjustment for the positioning of the lever. By this arrangement the maximum tension applied to band 23 is that applied by the tension of spring 31, regardless of the setting of cam 30.

Figure 2:
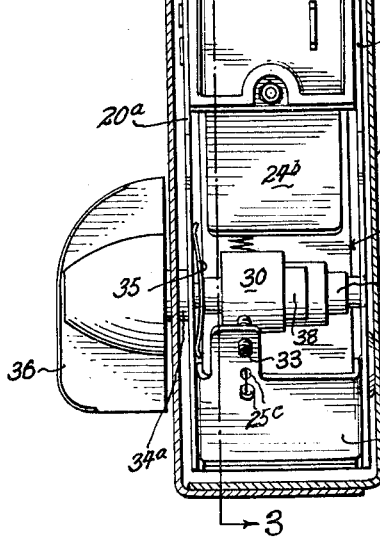
FIG. 2 is a view in section taken along line 2—2 of FIG. 1 but on a larger scale.

Cam 30 is attached to an adjusting shaft 34 journaled at opposite ends in side walls 20a and 20b of frame 20. The left hand end of shaft 34 as seen in FIG. 2 is enlarged as at 34a and this portion is urged to the left surface of wall 20a by a clip spring 35 which straddles a reduced portion of the shaft adjacent to the inner surface of the wall. The left hand end of shaft 34 projects through an opening in the central part of the front face of cover 17, and a knob 36 is attached to the shaft for rotation by user.

Figures 4, 5:
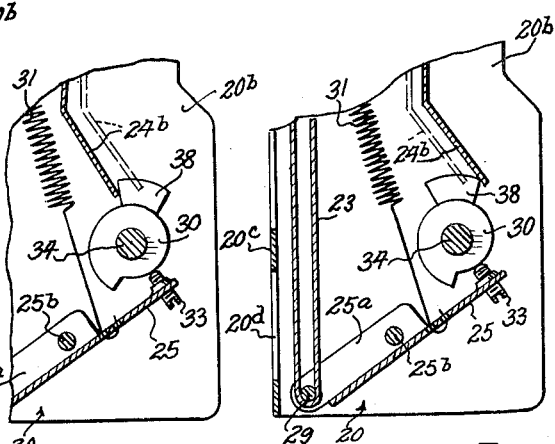
FIGS. 4 and 5 are fragmentary views of the apparatus as shown in FIG. 3, but illustrating certain parts of the control mechanisms in different positions.

Screw 33 rides on the periphery of cam 30 and as the cam is rotated clockwise, as viewed in FIGS. 3, 4 and 5, lever 25 is moved clockwise about its pivot and thereby tends to lessen the tension on band 23 which results in the band actuating lever 24 to open and close switch 22 in reference to a lower range of humidity values.

In normal operation, assuming that the humidity of the air is increasing, band 23 becomes gradually elongated, permitting lever 24 to rotate clockwise from the normal bias of switch blade 22d until switch 22 closes and energizes the dehumidifier, the operation of which removes moisture from the air. As the humidity of the air surrounding band 23 decreases, the band contracts, moving lever 24 counterclockwise until switch 22 is opened to deenergize the dehumidifier. Should the humidity of the air continue to decrease from any cause, band 23 will continue to contract until lever 25 is rotated clockwise and is removed from engagement with cam 30; thus, no damaging strain can occur to the band.

If it is desirable to control a humidifier by the control apparatus, for example, contacts of switch 22 could be reversed so that upon shrinkage of band 23, lever 24 would be moved to cause the switch to close and energize the humidifier to increase the moisture content of the air and vice versa.

It is frequently desirable to manually set switch 22 to either of its positions, irrespective of humidity conditions, and for this purpose a lug 38 is attached to cam 30 and is arranged to engage opposite sides of the depending end of lever 24b when shaft 34 is moved toward one or the other extremities of its rotation and thereby positively position plunger 22j in either the switch closing or opening position. As may be seen in FIG. 4, lug 38 moves lever 24b to the left to cause closing of the switch, and when shaft 34 is rotated in the opposite direction the lug engages and moves lever 24b to the right, as seen in FIG. 5, to open the switch mechanism, irrespective of the condition of band 23.

Figure 6:
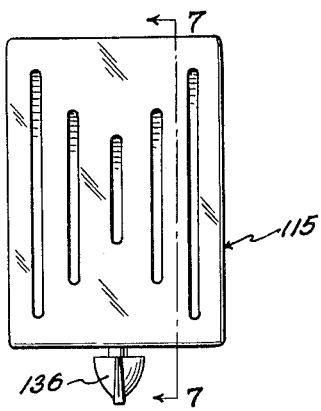
FIG. 6 is a front elevational view of a second form of humidistatic control embodying the invention.
Figure 7:
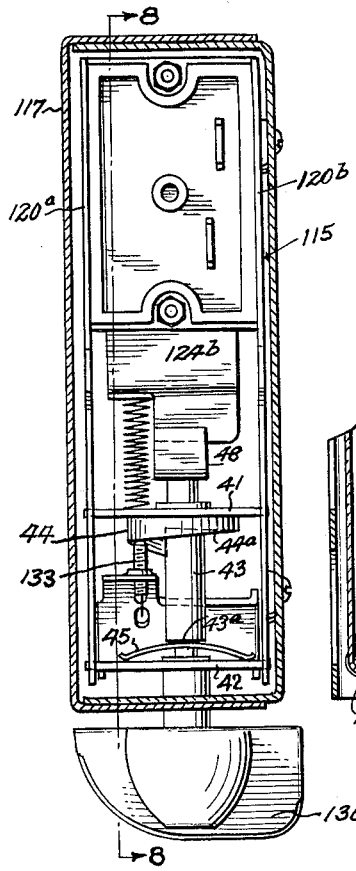
FIG. 7 is a view in section taken along lines 7—7 of FIG. 6, but on a larger scale.
Figure 8:
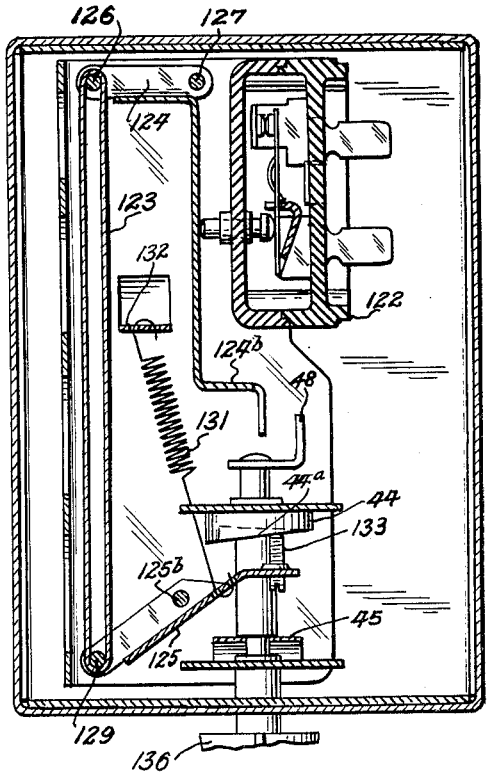
FIG. 8 is a view in section taken along line 8—8 of FIG. 7.
Figures 9, 10:
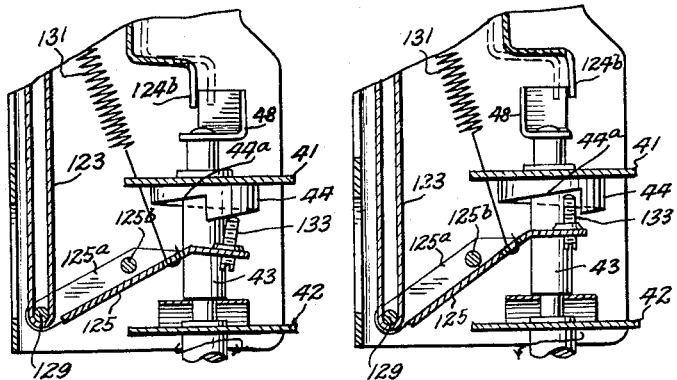
FIGS. 9 and 10 are fragmentary views of the apparatus as shown in FIG. 8 but illustrating certain parts in different positions.

In the event it is desirable that the adjusting shaft project downwardly through the lower end of the frame so that the adjusting knob is at the bottom of the cover as seen in the second form of control apparatus 115 shown in FIG. 6, the control apparatus described need only be modified in minor respects to provide for this arrangement. Referring to FIGS. 6 through 10, the second form of control apparatus is shown in which all parts similar to those of the first form are referred to by corresponding reference characters raised by 100, and the principal difference lies in the cam mechanism for adjusting the angular positions of lever 125. To provide for a vertical axis of rotation for knob 136, two spaced plates 41 and 42 are attached between side frame members 120a and 120b, and a cam shaft 43 is journaled in aligned openings through these plates. A cam 44 is attached to shaft 43 and is urged to plate 41 by a clip spring 45 bearing against plate 42 and a shoulder 43a formed on shaft 43.

Cam 44 is preferably of a molded plastic, such as nylon, and it has an inclined face 44a which provides a cam surface facing axially of the cam shaft 43 and which is engaged by screw 133 which rides on the cam face whereby lever 125 is moved to change the tension on sensing band 123, as described with reference to the first embodiment of the invention.

Provision is also made for positive manual operation of switch 122 by the adjusting mechanism, and in the second form, a crank shape member 48 is attached to the upper end of shaft 43 and its position and contour is such that during normal adjustment of cam 44, crank 48 does not engage the lower end of lever 124b; however, at opposite extremities of the rotation of shaft 43, the crank engages one side or the other of lever 124b to move the switch to its closed or open positions, as described hereinbefore with respect to lever 24b.

It will be seen that by providing a U-shaped frame and the lever arrangement by which the switch is operated and the element 23 adjusted, it is a simple expedient to provide an adjustment shaft extending from the lower end of the frame or through a side of the frame. The components of the control apparatus are readily and relatively easily formed and assembled.

Although but two forms of the invention have been shown and described, it is to be understood that other forms, modifications and adaptations could be embodied in the control apparatus, all falling within the scope of the claim which follows.

I claim:

In a control apparatus of the type described, a frame comprising two opposed side walls joined by a yoke wall, a first lever L-shaped and pivoted adjacent one end of said frame to swing in a plane parallel to said side walls and the other leg thereof extending toward the opposite end of said frame and terminating short thereof, a second lever pivoted adjacent said opposite end of said frame to swing in a plane parallel to the plane in which said first lever swings and extending in a direction transversely of said other leg and space therefrom, an elongated condition responsive element attached to and interconnecting the ends of said levers which lie adjacent said yoke wall, a switch mechanism supported on said frame and including an operating member engaged by said other leg of said first lever, and a rotatable actuating and adjusting means disposed intermediate the end of said other leg and said second lever, said means including a cam surface engaged by said second lever for movement of said second lever about its pivot in response to rotation of said means and a member engaging and moving the end portion of said other leg during a portion only of the rotative movement of said means.

References Cited in the file of this patent

UNITED STATES PATENTS 2,897,304    Kjellman et al. _____ July 28, 1959